United States Patent [19]

Umeki et al.

[11] 4,175,832
[45] Nov. 27, 1979

[54] TWO-AXIS MIRROR CONTROL APPARATUS

[75] Inventors: Nobutomo Umeki, Yokohama; Mikio Sugiki, Tokyo, both of Japan

[73] Assignee: Sony Corporation, Tokyo, Japan

[21] Appl. No.: 881,118

[22] Filed: Feb. 24, 1978

[30] Foreign Application Priority Data

Mar. 4, 1977 [JP] Japan .................................. 52/23556

[51] Int. Cl.² ............................................. G02B 27/17
[52] U.S. Cl. .............................. 350/285; 179/100.3 X;
350/6.6; 358/128
[58] Field of Search .................................. 350/285, 6.6

[56] References Cited
U.S. PATENT DOCUMENTS

| 3,946,166 | 3/1976 | Wossidlo | 179/100.3 V |
| 4,073,567 | 2/1978 | Lakerveld et al. | 350/285 |
| 4,100,576 | 7/1978 | Ditthardt | 350/285 |

Primary Examiner—John K. Corbin
Assistant Examiner—R. A. Rosenberger
Attorney, Agent, or Firm—Lewis H. Eslinger; Alvin Sinderbrand

[57] ABSTRACT

A mirror is held against a pointed supporting member by a magnetic field of attraction between a first magnetic assembly attached to the mirror and a second magnetic assembly spaced from the first assembly and directly or indirectly attached to the supporting member. The mirror can pivot in two directions in response to magnetic control fields produced by coils around the first magnetic assembly but is prevented by interlocking magnetic fields from rotating on an axis in a third direction. The interlocking fields may be produced by assymmetrically located magnetic members attached to the first and second magnetic assemblies or by dividing both the first and second magnetic assemblies into similar oppositely polarized sectors.

11 Claims, 10 Drawing Figures

TWO-AXIS MIRROR CONTROL APPARATUS

BACKGROUND OF THE INVENTION

1. Field of the Invention

This invention generally relates to playback apparatus for deriving signals from an optical video disk. More particularly, the invention is directed to a supporting system used in such playback apparatus for controlling a mirror for tracking and time base error correction.

2. Description of Prior Art

In playback apparatus for optically reproducing information recorded in the form of minute pits spaced apart on a spiral track on a flat disk, a beam of light from a source is directed along an optical path and is focused on the disk. The light beam is either reflected by or transmitted through the disk. In either case, the beam is modulated by the recorded pits, and the modulated beam is detected by a photodetector, and the output of the photo-detector is an electrical signal that is a reproduction of the information signal recorded in the minute pits.

This type of playback apparatus utilizes no mechanical track-following means, and so the recorded information can be reproduced without using a contact mechanism to follow the track. Because of this characteristic, various kinds of servo system, for example, the focus control servo, the tracking control servo, and the time base error control servo have been developed to keep the light beam directed at the track and even at the proper point along the track at each instant.

As described by Robert Adler in "An Optical Video Disc Player for NTSC Receivers", Transactions BTR, Aug. 1974, the beam can be directed precisely at the right point along the track instant by instant by a servo mirror system incorporating a two-axis mirror inclined at an angle to the optical path and thereby defining an intersection between two parts of the path. The mirror is affixed to a magnetic member and is pivotally supported by a pointed supporting member. Two pairs of driving coils are placed around this mirror with the axis of each pair perpendicular to the axis of the other pair. These coils can be energized by currents to create magnetic fields to interact with the magnetic member affixed to the mirror to pivot the mirror about its two axes and thereby direct the reflected light exactly to the right point along the track.

The first pair of coils controls the angle of inclination of the mirror in one direction so that the light beam can be moved in the radial direction of the disk to correct the tracking error. The second pair of driving coils controls the angle of the mirror in the perpendicular direction so that the light beam can be moved in the tangential direction of the disk, that is, longitudinally along the track to correct the time base error. By using this two-axis mirror, only one servo mirror need be used; one of two servo mirrors for tracking error correction and time base error correction can be omitted.

As is well known, the inclined angle of the mirror must be precisely controlled and careful, minute adjustments are necessary, particularly when the disk rotates at a high speed. If the inclined angle of the mirror is affected by other causes than by the drive coils, stable servo operation cannot be attained and correction of either the tracking error or the time base error is difficult to attain.

In this two-axis servo mirror system, the mirror is pivotally supported on the pointed tip of the supporting member and is likely to rotate about an axis through this point because the friction between the mirror and the supporting member is very small. But if the mirror can be supported so that its surface is perpendicular to the axis of the supporting member in the neutral state, even if the mirror is rotated on the axis, the deviation of the landing spot of the light on the disk in both the radial and tangential directions can be negligible. It is very difficult to maintain the reflective surface of the mirror precisely perpendicular to the axis of the supporting member, due primarily to the difficulty of controlling the mechanical accuracy of the position or the shape of the mirror and the supporting member. Therefore the mirror is likely to be supported in an inclined condition, even in the neutral state. In this condition if the mirror is rotatable on the axis of the supporting member, there are infinitely many stable surfaces in the mirror, so that the light is likely to deviate from the proper landing spot on the disk. Because of this, rotation of the mirror on the supporting member causes the tracking control and the time base control to be very unstable.

OBJECTS AND SUMMARY OF THE INVENTION

One of the objects of this invention is to provide improved means for controlling the landing spot of a light beam on the surface of a record by reflecting the beam from a mirror and controlling the angle of incidence on the mirror in two directions while preventing the mirror from rotating about an axis in a third direction.

The structure of this invention includes a mirror held in such a way that it is free to pivot in two orthogonal directions but is prevented by a magnetic field from rotating about an axis at an angle to the direction in which it can pivot. This selective constraint of the mirror is obtained by holding the back of the mirror against the pointed end of a supporting member. The mirror has a hemispherical depression in its back surface (or in the back surface of a support onto the front surface of which the mirror is attached), and the pointed end of the supporting member is within this depression, which prevents the mirror from sliding relative to the supporting member.

Controlled pivoting of the mirror on this single-point pivot is controlled by affixing magnetic means to the mirror and providing two sets of coils at equally spaced locations around the mirror so that magnetic fields in the coils can interact with the magnetic means to tilt the mirror in two mutually perpendicular directions. The force of attraction that holds the back of the mirror against the point of the supporting member is provided by second magnetic means surrounding the supporting member and polarized to attract the first magnetic means.

In accordance with this invention the mirror is prevented from rotating on the single-point pivot by arranging the magnetic means so that they have interlocking magnetic fields that prevent such rotation. For example, an extra, fixed magnetic member can be attached to the immobile part of the structure to attract one part of the pivotally mounted magnetic means. Alternatively, the pivotally mounted magnetic means can have permanently magnetized sections of opposite polarity to coact with correspondingly oppositely polarized magnetized sections of the immobile magnetic means to form interlocking field regions that prevent rotation.

The magnetized sections of the immobile megnetic means can be part of an annular structure, or they can be separate members to allow the coils that control tilting to extend between them. The coils can also extend through holes in the magnetized sections of the immobile magnetic means.

DETAILED DESCRIPTION OF PREFERRED EMBODIMENT

Figure 1:
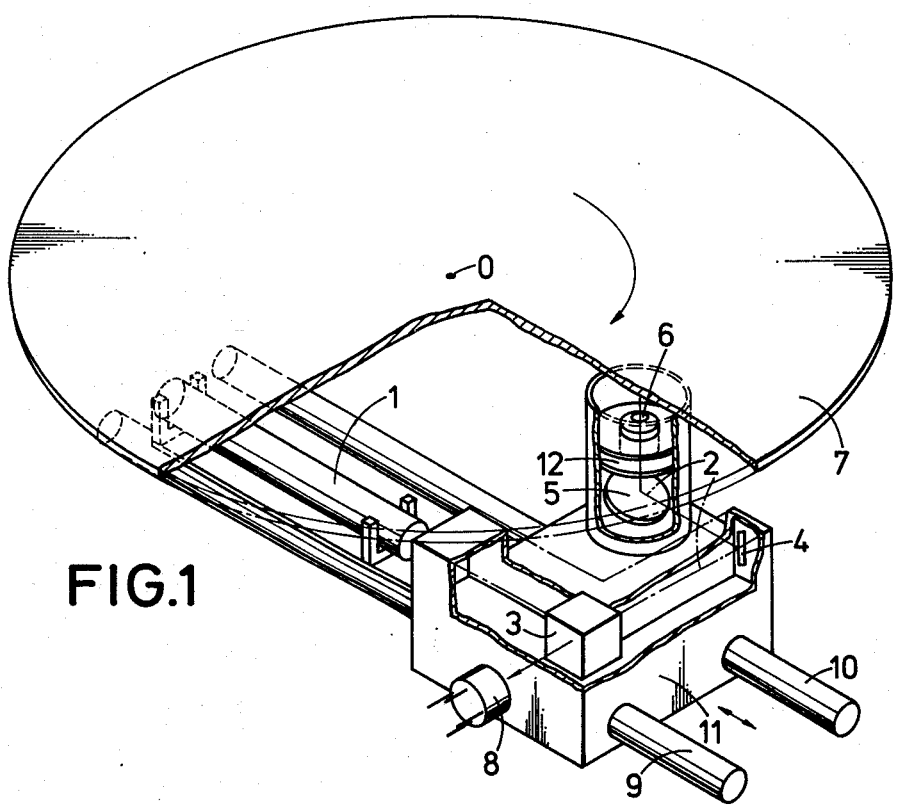
FIG. 1 is a perspective view of part of a playback and servo control system for obtaining recorded information from a disk.

FIG. 1 shows a simplified drawing of a video disk reproducer incorporating the present invention. A laser tube 1 emits a beam 2 that is reflected by a prism 3, a mirror 4, and a servo mirror 5 and is focused by an objective lens 6 ona predetermined point on the lower surface of a video disk 7. This surface has infinitesimal pits arranged in a spiral pattern to record video information. The laser beam, reflected, from the surface of the disk, is modulated in accordance with the video information recorded on the disk 7 and returns along a path 8 that passes back through the objective lens 6, is reflected by the servo mirror 5 and the mirror 4, and directed onto a photo-detector 8 that converts the beam into an electrical signal.

The prism 3, mirror 4, servo mirror 5, objective lens 6, and photo-detector 8 are all mounted on a movable support 11 that can be moved longitudinally along a pair of guides 9 and 10 in the direction shown by the double-ended arrow. The video disk 7 is rotated on its axis O in the usual way by a motor (not shown) so that the laser beam spot is moved sequentially along the spiral record track formed on the surface of the video disk 7. In this way the recorded information can be derived by the laser beam.

The fact that, in the video disk reproducer, the information on the disk is read without mechanical contact between the surface of the disk and a transducer makes control of the focus and position of the landing spot of the beam very important factors in order to reproduce the recorded information faithfully. Focus control is achieved by arranging a magnetic coil 12 around the objective lens 6 and controlling the position of this lens axially along the beam 2 by a servo control signal.

Figure 2:
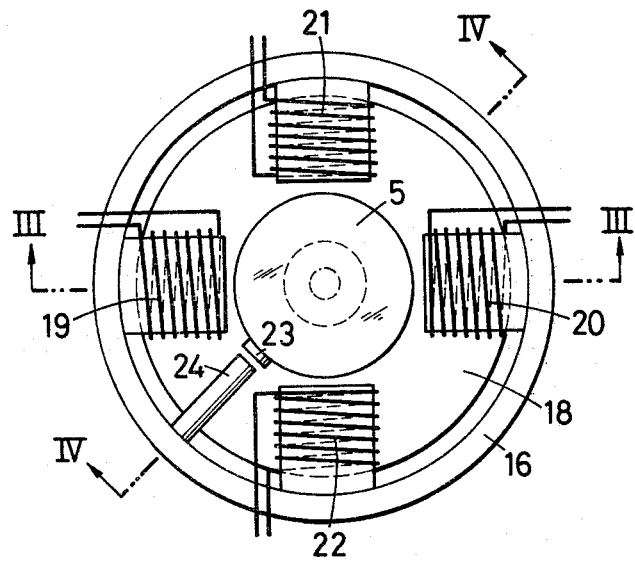
FIG. 2 is a plan view of a mirror support and control system for obtaining two-axis control of the angle of tilt of the mirror, but without allowing rotation thereof, in accordance with this invention.
Figure 3:
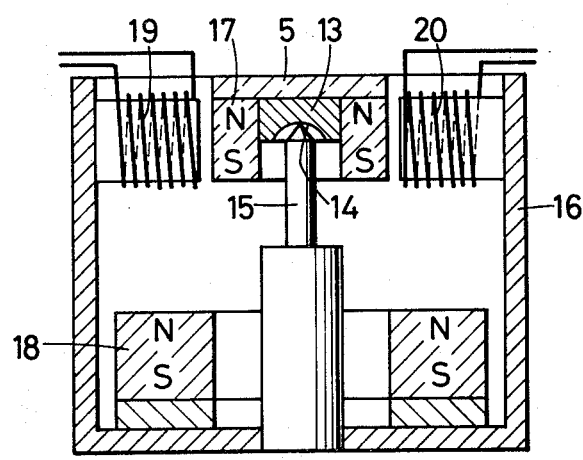
FIGS. 3 and 4 are cross-sectional views of the system in FIG. 2 along lines III—III and IV—IV, respectively, in FIG. 2.
Figure 4:
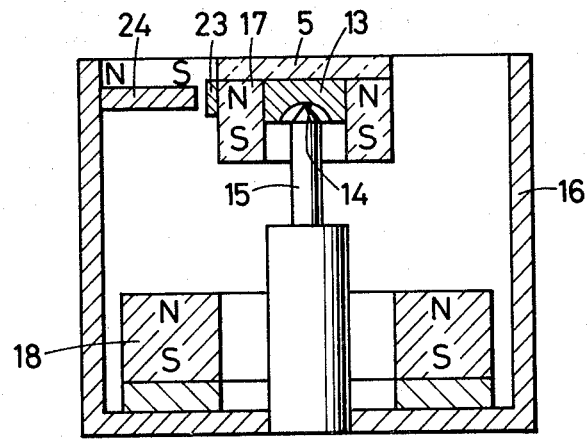

Control of the position of the landing spot of the beam on a particular turn of the spiral track and along that section of the track is achieved by the two-axis servo mirror 5 as shown in FIGS. 2-4. The mirror 5 is mounted on the front surface of a circular support 13, and a hemispherical recess 14 is formed in the back surface of this support 13. A supporting member 15 having a pointed end is inserted in the recess and the mirror 5 is pivotally supported thereby, and the other end of the rod-shaped supporting member 15 is affixed to the bottom of a cylindrical casing 16. An annular permanent magnet 17 is attached to the back of the mirror 5 around the circular support 13, and another annular magnet 18 is attached to the bottom of the casing 16. Both of these magnets 17 and 18 are axially magnetized with opposite poles facing each other to exert an attractive force between magnets. Accordingly, the circular support 13 supporting the mirror 5 is pressed against the pointed end of the supporting member 15, and this prevents the mirror 5 from dropping off of the supporting member.

Two pairs of drive coils 19, 20 and 21, 22 are arranged around the magnet 17 with the axis of the coils 19 and 20 perpendicular to the axis of the coils 21 and 22. One pair of these coils, for example, the coils 19 and 20, is arranged to generate a magnetic flux perpendicular to the magnetic flux of the magnet 17 to incline the mirror in a certain direction so that the laser beam 2 moves radially with respect to the video disk 7. The current flowing through the drive coils 19 and 20 may be obtained from a differential amplifier supplied with output signals from a pair of photo-diodes (not shown) arranged adjacent both sides of the record track for generating a signal corresponding to the difference of the amount of light impinging on these photo-diodes.

The second pair of coils 21 and 22 generates a magnetic flux which is also perpendicular to the magnetic flux of the magnet 17 but is in the direction to tilt the mirror so that the landing spot of the laser beam on the surface of the disk 7 is moved in the tangential direction of the track on the disk. To achieve this tilting a current obtained as a detected output of an FM discriminator responding to a pilot signal recorded on the disk is made to flow through the coils 21 and 22. The correction of the landing spot of the laser beam in the tangential direction on the disk thereby corrects the time base error of the reproduced signal.

Usually, in the neutral state, it is very difficult to support the mirror 5 to be precisely perpendicular to the axis of the supporting member 15 because of magnetic and physical imbalance of the magnet 17 and eccentric placement of the recess 14 in the circular support 13 against the magnet 17. Therefore the mirror is supported by the supporting member 15 at an angle, so if the mirror were rotatable on this supporting member, there would be infinitely many stable faces in the mirror 5. A small projection 23 of iron or other ferromagnetic material is located near the magnet 17 and a cylindrical permanent magnet 24 is attached to the casing facing to the projection 23 to prevent the mirror from rotating. The magnet may be located, for example, between the coils 19 and 22 where it will be 45° away from the axes of both coils 19 and 22. The magnet 24 attracts the projection 23, thereby preventing the mirror 5 from rotating on the supporting axis 15. Thus, variation of the inclined angle of the mirror due to rotation of the mirror can be prevented. As a result, tracking error correction and time base error correction can be achieved more positively.

Figure 5:
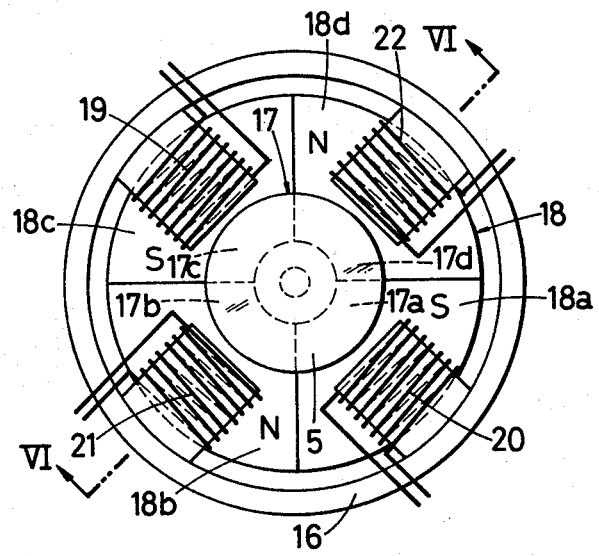
FIGS. 5 and 6 are plan and cross-sectional views, respectively, of a modified embodiment of the structure in FIGS. 2-4.
Figure 6:
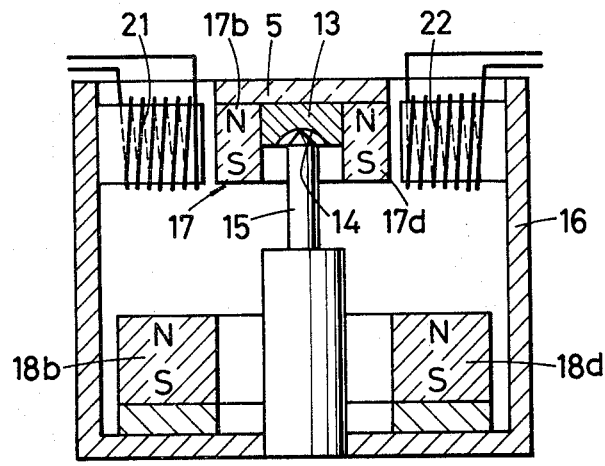

A second embodiment of this invention is shown in FIGS. 5 and 6. In the first embodiment, rotation of the mirror 5 on its supporting member 15 is prevented by the force of attraction of the interlocking magnetic field between the magnet 24 and the projection 23, but in the second embodiment no additional magnets are required to establish an interlocking field. Instead, the magnets 17 and 18 are both divided into four 90° sectors 17a–17d and 18a–18d, respectively, and each sector is magnetized with opposite magnetic polarity. The magnetized sectors are shifted by 90° with each other, as shown in FIG. 6, so that the lower faces of the magnetized sectors 17b and 17d and the upper faces of the corresponding magnetized sectors 18b and 18d are oppositely magnetized.

Therefore, the magnetic fields of the sectors 17a–17d and 18a–18d prevent the magnets 17 and 18 from rotating with respect to each other. This prevents the mirror 5 affixed to the magnet 17 from rotating on the supporting member 15. In this second embodiment, locally magnetized areas of the magnets can be used in magnets 17 and 18 instead of using divided magnetic sectors. These magnets still generate the attractive force to press the surface of the recess 14 of the circular support 13 against the tip of the supporting member 15.

Figure 7:
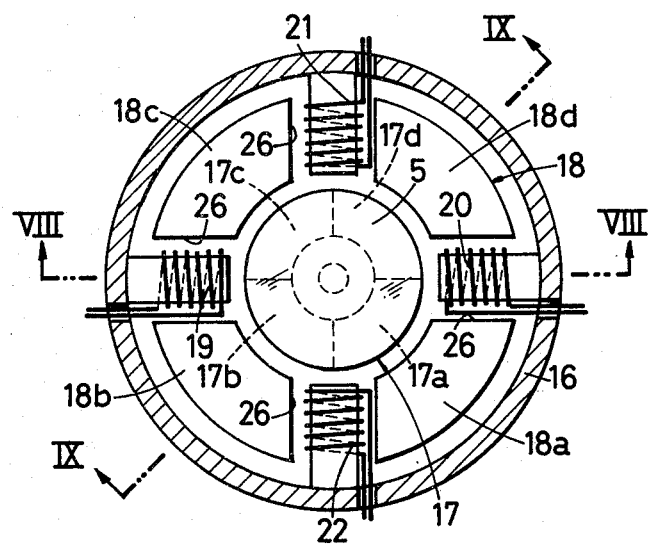
FIGS. 7-9 are plan and cross-sectional views of another embodiment of the invention.
Figure 8:
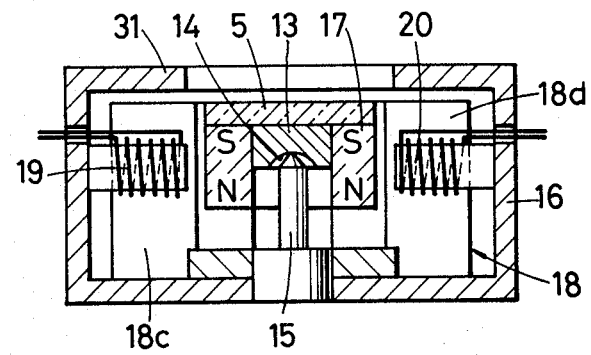
Figure 9:
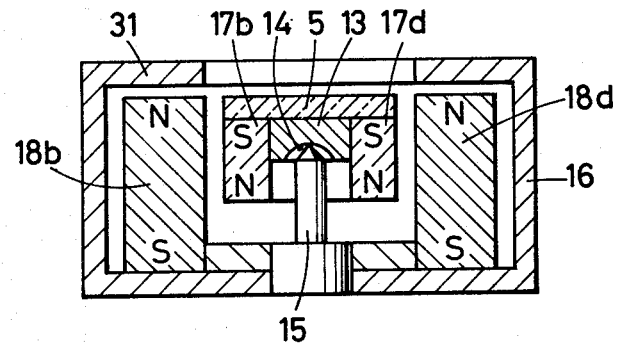

In a third embodiment of this invention shown in FIGS. 7 through 9 the inside diameter of the magnet 18 is made larger than the outside diameter of the magnet 17, and the magnet 17 and the mirror are placed inside the magnet 18. By this arrangement, the structure of the two-axis servo mirror can be made more compact, thus allowing the distance between the mirror 5 and the video disk 7 to be shortened. The light from the laster can be utilized more effectively in such a structure to reproduce the recorded information. In this embodiment, the magnet 18 is divided into four sector-shaped pieces, and gaps 26 are formed between these pieces of the magnet 18. Each of the driving coils 19, 20, 21 and 22 is placed in one of these gaps.

Figure 10:
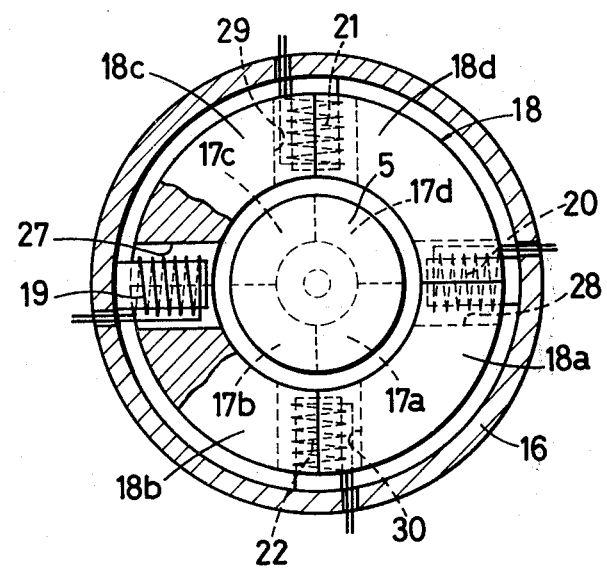
FIG. 10 is a plan view of yet another embodiment of the invention.

FIG. 10 illustrates a further embodiment in which the magnets 18a–18d are not separated into four pieces to provide gaps to accommodate the coils 19–22, but instead, four penetrating holes 27–30 are formed 90° apart in the magnet 18 and the four coils 19–22 are placed in these holes. The magnet 17 is divided into four pole areas 17a 17b and the magnet 18 is divided into an equal number of segments 18a–18d in a manner similar to the magnets 17 and 18 in FIGS. 5 and 6. These poles can be produced by permanently magnetizing solid permanent magnetic material, such as a suitable ferrite, or by forming four separate permanent magnets that fit against each other instead of being spaced apart as in the embodiment in FIGS. 7–9. In FIG. 10, fragments of the magnet 18 are broken away to show the arrangement of the coil 19 in the hole 27.

In the embodiments in FIGS. 7–10, flange portions 31 are formed together with the casing extending inwardly on the upper face of the casing 16, which is made of a high permeability material, such as permalloy, to stabilize the magnetic paths of the magnets 17 and 18. In addition, the magnetic influence of the magnetic coil 12 (shown in FIG. 1) located above the mirror 5 can be eliminated by this flange.

The magnet 18 overlaps the magnet 17 in the embodiments in FIGS. 7–9 and FIG. 10, thereby shortening the air gap between these magnets and improving the effect of the interlocking magnetic fields in preventing rotation of the mirror 5.

While this invention is illustrated with specific embodiments, it will be recognized by those skilled in the art that modifications may be made therein without departing from the true scope of the invention as defined by the following claims.

What is claimed is:

1. Control apparatus for allowing pivotal movement of a mirror in two directions and preventing rotation thereof in a third direction, said apparatus comprising:
   a mirror;
   a support member comprising a substantially pointed end against which said mirror is held and about which said mirror can pivot in two directions;
   first magnetic means affixed to said mirror to pivot therewith; and
   second magnetic means rigidly attached to said support member and spaced from said first magnetic means and polarized with respect to said first magnetic means to provide an interlocking magnetic field attracting said first magnetic means to urge said mirror toward said support and to prevent said mirror from rotating in a third direction on said support member.

2. The apparatus of claim 1 in which said first magnetic means comprises an annular permanent magnet and an additional ferromagnetic member attached thereto assymmetrically with respect to the axis of said permanent magnet, and said second magnetic means comprises a second permanent magnet and a further ferromagnetic member extending toward said additional ferromagnetic member to establish therewith said interlocking magnetic field.

3. The apparatus of claim 2 in which said further magnetic member is an axially polarized cylindrical permanent magnet.

4. The apparatus of claim 2 comprising, in addition:
   a first pair of coils on diametrically oposite sides of said annular permanent magnet; and
   a second pair of coils on diametrically opposite sides of said annular permanent magnet and midway between said first pair of coils, said additional ferromagnetic member and said further ferromagnetic member being substantially centrally located between one coil of said first pair of coils and one coil of said second pair of coils.

5. The apparatus of claim 1 in which said first and second magnetic means have substantially circular perimeters and are substantially coaxial and axially spaced apart.

6. The apparatus of claim 1 in which said first magnetic means comprises a plurality of first poles, adjacent ones of said poles being oppositely polarized, and said second magnetic means comprises a plurality of second poles equal in number to the number of said first poles and adjacent ones of said second poles being oppositely polarized and coating with said first poles to establish said interlocking magnetic field attracting said first magnetic means to urge said mirror toward said support and to prevent said mirror from rotating.

7. The apparatus of claim 6 in which said first poles and said second poles are sector-shaped.

8. The apparatus of claim 6 in which said first and second magnetic means are annular magnets and said first and second poles are permanently magnetized areas of said first and second magnetic means, respectively.

9. The apparatus of claim 8 in which said second magnetic means comprises individual, longitudinally magnetized, sector-shaped permanent magnets extending alongside said first magnetic means and surrounding said first magnetic means.

10. The apparatus of claim 9 comprising four of said sector-shaped permanent magnets spaced apart from each other, and said apparatus further comprises four control coils, each located between an adjacent pair of said sector-shaped magnets and extending sufficiently close to said first magnetic means to cause said first magnetic means and said mirror to pivot in either of two mutually perpendicular directions according to control currents in said coils.

11. The apparatus of claim 8 in which said second magnetic means conprises multi-pole permanently magnetized means extending alongside and surrounding said first magnetic means, and comprising a plurality of diametrically opposed holes extending through said second magnetic means; and said apparatus further comprises a control coil in each of said holes to produce control fields to tilt said first magnetic means and said mirror in predetermined cirections according to control currents in said coils.

* * * * *